March 31, 1970 HANS-MARTIN CHRISTIANSEN 3,504,118

METHOD AND APPARATUS FOR THE ADDITIONAL TRANSMISSION OF COMMUNICATIONS OVER LINES

Filed Aug. 19, 1966 5 Sheets-Sheet 1

INVENTOR
HANS-MARTIN CHRISTIANSEN

Hill & Hill

ATTORNEY

INVENTOR
HANS-MARTIN CHRISTIANSEN
Hill + Hill
ATTORNEY

INVENTOR
HANS-MARTIN CHRISTIANSEN

Hill & Hill
ATTORNEY

INVENTOR
HANS-MARTIN CHRISTIANSEN
Hill & Hill
ATTORNEY

March 31, 1970 HANS-MARTIN CHRISTIANSEN 3,504,118

METHOD AND APPARATUS FOR THE ADDITIONAL TRANSMISSION OF COMMUNICATIONS OVER LINES

Filed Aug. 19, 1966 5 Sheets-Sheet 5

INVENTOR
HANS-MARTIN CHRISTIANSEN

Hill & Hill

ATTORNEY

United States Patent Office 3,504,118
Patented Mar. 31, 1970

3,504,118

METHOD AND APPARATUS FOR THE ADDITIONAL TRANSMISSION OF COMMUNICATIONS OVER LINES

Hans-Martin Christiansen, Munich-Solln, Germany, assignor to Siemens Aktiengesellschaft, Munich, Germany, a corporation of Germany Filed Aug. 19, 1966, Ser. No. 573,714
Claims priority, application Germany, Aug. 20, 1965, S 98,945
Int. Cl. H04l 5/14
U.S. Cl. 178—58 16 Claims

ABSTRACT OF THE DISCLOSURE

Method and apparatus for providing additional communication transmissions with pulse modulation over lines, in which the pulse transmissions from a first station, received at a second station are utilized to derive a pulse transmission in the opposite direction, with an impulse or impulse group being received at the first station before the latter transmits a new impulse or impulse group subsequent to that from which the returned impulse or impulse group was derived.

The invention relates to a method for the additional transmission of communications with pulse modulation, preferably pulse phase modulation, over lines, and apparatus therefor.

The rapidly growing demand for additional channels of communication, caused by economical developments, has, in the past years, led to the development of communication transmission systems in which the transmission lines are utilized multiply with a steadily increasing number of channels. Beyond this, the high demand for additional channels of communication has led to the feature that existing lines are developed for a multiple exploitation, for example, by means of pulse phase modulation or pulse code modulation. Since the transmission line constitutes quite a considerable portion of the entire constructional expenses of a channel of communications, its multiple exploitation also achieves the end result of communications channel which is as cheap as possible, as to cost per channel.

With regard to all of these efforts for a rational building-up and completion of communication networks which, on the whole, have been successful, it should not, however, be overlooked that the multiple exploitation of lines has essentially remained limited to lines of the local and higher level, although the most expensive portion of a communication network, particularly of a telephone network, is that represented by the subscriber connection lines. While subscriber lines, of course, likewise have been utilized in a multiple manner by the feature that two subscribers enjoying equal rights are assigned to a single subscriber line. Such a two-party line system can, however, not replace a multiple exploitation since, in contrast thereto, it does not permit simultaneous operation of both subscriber stations.

It is the purpose of the invention to provide, in installations for the transmission of communications of the kind initially described, a simple solution for multiple exploitation, in particular, of subscriber's line.

Proceeding from a method for the additional transmission of communications by means of pulse modulation (PM), preferably pulse phase modulation (PPM), over lines of relatively small length, this problem is solved according to the invention by the feature that the modulated pulse, transmitted from the first terminal station to the second terminal station, is utilized at the second terminal for the production of the pulse to be modulated and to be transmitted in the opposite return direction in such a manner that from an arriving impulse or from an arriving impulse group thereof, an impulse or an impulse group is again derived for the transmission in opposite direction, and that this derived impulse or derived impulse group is received at the first terminal before such terminal transmits a new impulse or a new impulse group.

The invention is based upon the conception that a multiple exploitation, particularly of subscriber lines, can be undertaken in practice only if the demands on transmission, with respect to cross talk and freedom from distortion, is achieved at a small expenditure of equipment. In this context, it should be noted that the length of subscriber's lines in telephone networks amounts on the average to 2.2 km., and that line lengths of over 7 km. seldom occur. The invention involved utilizes the small line length by the feature that the additional communications transmission in both directions is undertaken by the use preferably of pulse phase modulation, not simultaneously but successively. In this manner the measures for the suppression of the adjacent cross talk can, as a rule, be omitted because due to the successive transmission according to the invention no cross talk can occur. The remote cross talk does not present any difficulties either since its influence, because of the short line lengths, remains so small that it may be disregarded. This is not only true with regard to the two transmission directions of a channel formed by two terminals and one subscriber's line, but also with regard to the cross talk, in particular the adjacent cross talk, between different channels of one and the same leader cable, if the impulse supply for all of the respective first terminals of these channels is obtained from a single impulse producer.

The method according to the invention is particularly suitable for a two-wire channel of communications as it normally exists with regard to telephone subscriber's lines. Beyond this, the object of the invention presents the possibility of utilizing a four-wire channel of communications in a threefold manner by the feature that a terminal is additionally assigned to each cable pair at the terminal connections.

The expenditure with regard to equipment at the second terminal is especially favorable when utilizing pulse phase modulation if the phase modulated impulse transmitted from the first terminal and received at the second terminal is again directly utilized as an impulse to be modulated in its phase for transmission in opposite return direction.

In this case the sum of the running time of the phase modulated impulses along the signal route in both transmission directions, the twofold impulse duration and the fourfold maximum modulation percentage $\lesseqgtr$ the mean or center period of the impulses following one after another in a single transmission direction.

The lines over which the additional communication is to be transmitted in pulse modulated form are, as a rule, not free of junction points which partially reflect the impulses. These reflected impulses, in the following called echo impulses, may cause considerable interference. According to a development of the invention, these echo impulses are suppressed by the feature that the impulses arriving at one terminal must overcome an electrical threshold at the input side, which is adjusted to its maximum value by each leaving impulse, on leaving the impulse group, at the transmitting side of the same terminal, and which subsequently preferably in an exponential manner, decreases toward a minimum value which can only be overcome by the impulses emitted from the other terminal.

Expediently, this threshold is simultaneously utilized for the blocking of the receiving side with respect to the impulses controlling the same, leaving at the transmitting side thereof.

The additional transmission of communications over a line according to the method of the invention presupposes a sufficient decoupling of the communications to be transmitted simultaneously independently of each other. With regard to telephone subscriber's lines, the customarily transmitted communications have a low frequency character and are mainly limited to a frequency range of 300 Hz. to 3400 Hz. In this case, it is particularly suitable to give the impulses to be modulated with the additional communications a bipolar shape with a peak of the spectral energy above 50 kHz. because for this reason, among others, no excessively high requirements must be made with regard to the filters connected in series ahead of the terminal points.

In this case, the method according to the invention offers special advantages if it is utilized in the transmission of speech via subscriber's lines for the creation of an additional subscriber station per subscriber line in such a manner that the first terminal point acts as PM subscriber's station of the exchange apparatus and the second terminal point acts as PM subscriber's station. In this case the NF (amplitude modulated) and PM (pulse modulated) subscriber's stations common to one subscriber's line have to be respectively decoupled from each other at the terminal connections of the subscriber's line by a high pass filter/low pass combination.

In order to safely exclude the adjacent crosstalk between the different subscribers, all PM subscriber's stations of the exchange apparatus (first terminal points) expediently are supplied with the impulses to be modulated and to be transmitted via the subscriber's lines to the PM subscriber's stations (second terminal points) from the impulse sequence of a common impulse generator.

In view of the audible signals and selection signals required for the operation of such additional subscriber's stations, it is extremely advantageous to continuously transmit impulses from the first terminal point via the subscriber's line to the second terminal point during which process these impulses are utilized at the second terminal point for the production of the impulses to be modulated for the transmission in opposite direction only if the subscriber station representing the second terminal point is placed in operation.

In this case a rhythmical interruption of the impulses continuously transmitted from the first terminal point to the second terminal point may function as criterion for the subscriber's call, and the reception of the impulses to be transmitted from the second terminal point to the first terminal point may be utilized for the indication at the first terminal point of the placing in operation of the subscriber's station representing the second terminal point. In a similar manner the selection symbols to be transmitted from the second terminal point to the first terminal point may be transmitted in the form of a different number of rhythmical interruptions of the impulse sequence transmitted from the second terminal point.

In a preferred installation for the execution of the method according to the invention, each of the two terminal points includes at the transmitting side a modulation device, and at the receiving side a demodulation device by means of which the original communication is devised from the received modulated impulses, and in which the output of the modulation device is connected with the transmission line preferably over an amplifier, with input of the demodulating device being connected with the transmission line over a controllable threshold control circuit, preferably over a network exhibiting filter characteristics. In this case the impulse sequence at the output of the modulation device is conducted to the control input of the threshold control circuit as the control value.

When pulse phase modulation is utilized, it is especially suitable with regard to the immediate utilization of the phase modulated impulses transmitted from the first terminal point, received at the second terminal point as impulse to be modulated in opposite direction, in consideration of a sufficiently small distorting factor, to provide as the demodulation device a modulation convertor with a low pass filter at the output thereof, said modulation convertor transforming the received phase modulated impulses into continuously modulated impulses. In this case the modulation convertor has two inputs, to one of which the phase modulated impulses determining the modulated flank or edge of the continuously modulated impulses are conducted and to the other input of which is connected a pulse beat determining the unmodulated flank or edge of the continuously modulated impulses. This pulse beat at the other output of the modulation convertor consists, at the first terminal point in the output impulse sequence of the modulation device of such terminal point, and at the second terminal point in an oscillation, possibly delayed, more particularly an impulse sequence of uniform repetition frequency, derived from the impulses arriving at the receiving side. In this case, the modulation convertor may advantageously be a bistable circuit.

The controllable threshold control circuit may, in simple manner, be a storage element which determines the blocking potential of the control electrode of an amplifier element as a function of its charge, the charging time constant of which is so small that it may be disregarded and the discharging time constant of which is proportioned in such a manner that the blocking potential effectively suppresses echo impulses possible with respect to the receiving device, without impairing the reception of the impulses arriving from the distant terminal point.

When using bipolar impulses, the operation has to be related to a half period of such impulses. For this reason it is, in this case, necessary to provide a rectifier with suitable polarity in the supply line, on the one hand, of the modulated impulses at the output of the modulation device directed toward the control input of the threshold control circuit, and on the other hand, of the frequency directed toward the further input of the modulation convertor.

The current supply for the PM subscriber's stations may, in a simple and advantageous manner, be undertaken by means of a storage cell, for example by means of a cadmium cell, which is connected with the direct voltage supplied to the NF subscriber's station from the exchange via a charging resistance. In this case the charging resistance must be of sufficiently high resistance that the shunt caused by it does not simulate a loop at the exchange.

The invention will be explained in greater detail with the aid of the examples of construction illustrated in the drawings, wherein like reference characters indicate like or corresponding parts, and in which.

Figure 4:
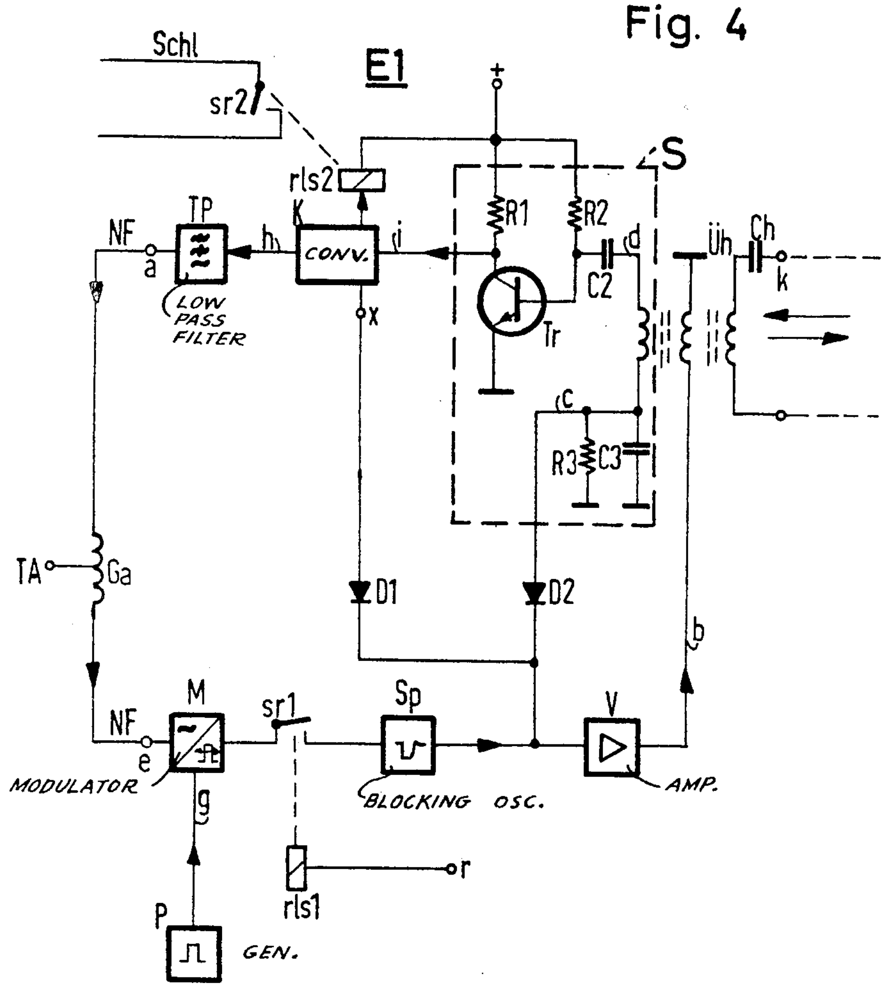
Figure 5:
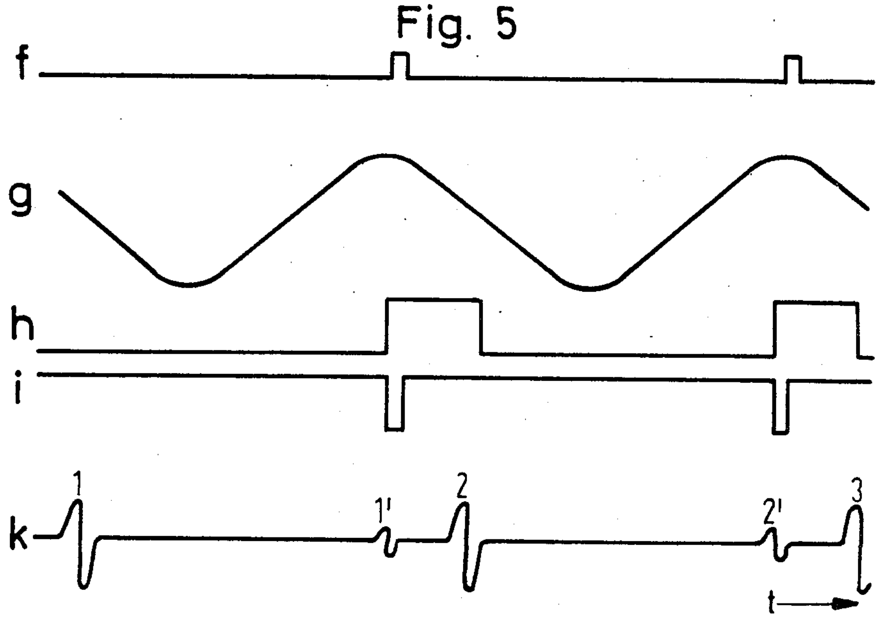
Figure 6:
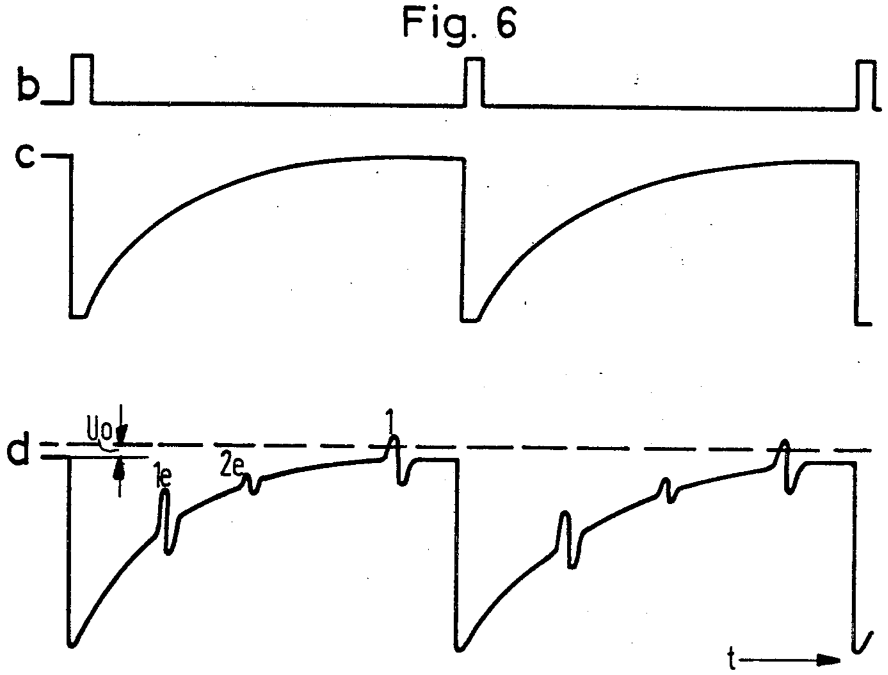

FIGS. 4 and *4a*, taken together, represent a circuit diagram of connections of an exchange side subscriber device and a subscriber's station according to the invention; and FIGS. 5 and 6 are time diagrams of the most important voltages occurring in the circuit of FIG. 4.

Figure 1:
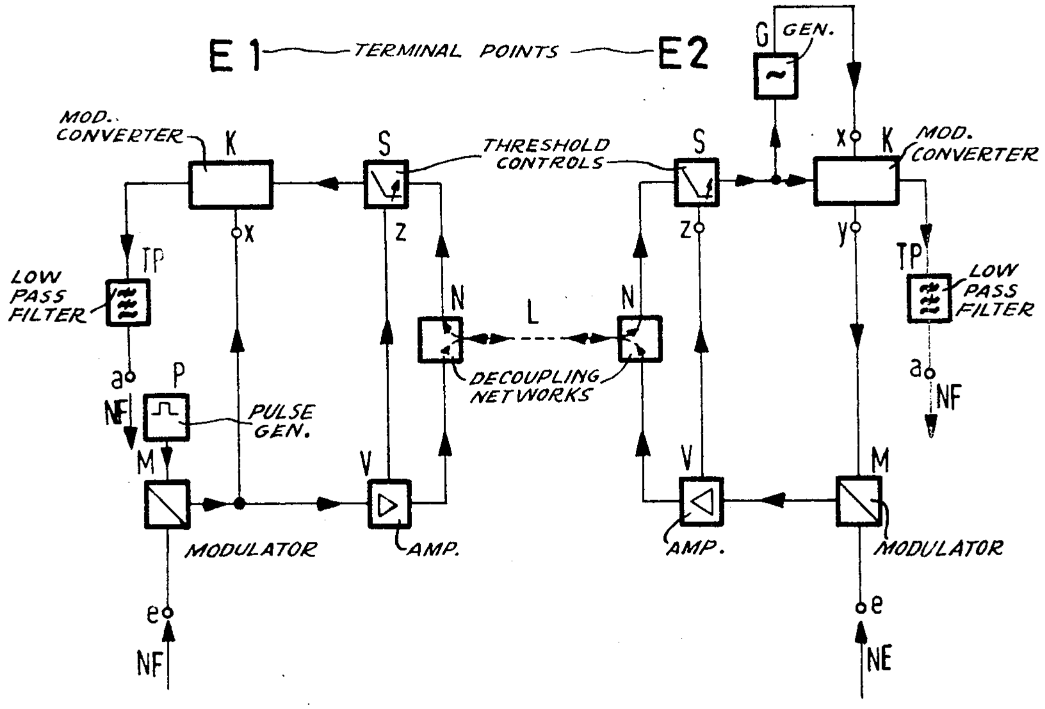
FIG. 1 is a schematic diagram, in block form, of two terminal points for the additional communication transmission, utilizing pulse phase modulation according to the method of the invention.

The block diagram pictured in FIG. 1 illustrates an example of a form of construction, according to the invention, for two terminal points, E1 and E2 for additional communications transmission, with pulse phase modulation, over lines of relatively small length. For reasons of clarity, the line L, which connects the two terminal points with each other and is utilized for the transmission of at least one further communication, is indicated only by a broken line. Each of the two terminal points E1 and E2 is connected to the line L over a respective network N which serves for the decoupling of such terminal points from communications which are transmitted over such line, but originate from neither of the two terminal points here involved. Furthermore, each one of the two terminal points includes at the transmitting side thereof, a modulator M to the output of which is connected an amplifier V. The impulses to be modulated are conducted to the modulator M of the terminal point E1 from a pulse generator P, normally quartz stabilized, while the modulator M of the terminal point E2 receives such impulses, in a manner which will be subsequently explained in detail, from the receiving side of such terminal point. The low frequency modulation voltage NF is connected at the inputs *e* of the modulators. Each of the two terminal points also contains on the receiving side adjacent the network N, a controllable threshold control circuit S to the control input *z* of which are conducted the output impulses of the modulator M at the transmitting side of the same terminal. The actual demodulation device is adjacent to the threshold control circuit S, said demodulation device, in the example of construction illustrated in FIG. 1 comprising a modulation convertor K which has a low pass filter TP connected to its output, which converts the arriving phase modulated impulses into continuously modulated impulses. The low frequency signal NF, restored to its original shape, is taken off at the output *a* of the low pass filter TP.

As is evident from FIG. 1, the modulation convertor at each terminal has an additional input *x* to which, with respect to the modulation convertor of the terminal E1, the modulator output impulses of such terminal are conducted and, with respect to the modulation convertor of the terminal E2, the output of the generator G is conducted. The generator G of the terminal E2 is synchronized by the output impulses of the threshold control circuit S. If the impulses at the output of the threshold control circuit possess sufficient energy, the generator G may be replaced by a passive network consisting of a resonant circuit of high quality. The modulator output impulses, conducted to the input *x* of the modulation convertor of the terminal E1, determine the time position of the flank or edge of the continuously modulated impulses to be produced by the modulation convertor which flank may be termed unmodulated, the modulated flank of the impulses to be defined by the received phase modulated impulses. In the same manner the output of the generator G of the terminal E2 determines the unmodulated flank of the continuously modulated impulses occurring at the output of the modulation convertor K, the modulated flank of which, in its turn, is determined by the received phase modulated impulses. Simultaneously, the phase modulated impulses conducted to the input of the modulation convertor K from the output of the threshold control circuit S of the terminal E2 are conducted from the output *y*, as impulses to be modulated, to the modulator M at the transmitting side of such terminal. The impulses arriving at the terminal E1 consequently are modulated by the low frequency signal NF, at the input *e* of the modulator of the terminal E1, as well as by the modulator of the terminal E2. The double modulation resulting from the phase modulated impulses originating at the terminal E1, however, is eliminated in the modulation convertor K of such terminal because, owing to the particular circuit, this modulation portion of the signal uniformly influences the time position of both flanks or edges of the continuously modulated impulses. In other words, if modulation voltage NF is absent at the input *e* of the modulator M of the terminal E2, no continuously modulated impulses occur at the output of the modulation convertor K of the terminal E1. If the output impulses are of the same duration, however, they are modulated as to their phase by the modulation voltage at the input *e* of the modulator M of this terminal. However, this phase modulation has practically no influence upon the output *a* of the low pass filter TP because the phase modulated impulses, in contrast to continuously modulated impulses, exhibit only such small low frequency component that they may be disregarded.

The immediate utilization of the phase modulated impulses arriving at the terminal E2 as impulses to be modulated for communication transmission from the terminal 2 to the terminal 1 has the considerable advantage of an optimum utilization of the time interval, as a rule presupposed between two successive transmitting impulses of the terminal E1. In addition thereto, because of this feature no special requirements must be imposed upon the generator G of the terminal E2 which otherwise would have to be utilized for obtaining the impulses to be modulated.

The controllable threshold voltage of the respective threshold control circuit S at the receiving side of each terminal is, with each transmitting impulse of the same terminal, adjusted to its maximum value and subsequently diminishes, preferably in an exponential manner, to a minimum value as subsequently explained in detail. As likewise will subsequently be explained in greater detail, because of this, it is, on the one hand, apparent that the impulses leaving at the transmitting side cannot re-affect the receiving side of the same terminal and that, on the other hand, any echo impulses which may be produced at any junction points are suppressed.

Figure 2:
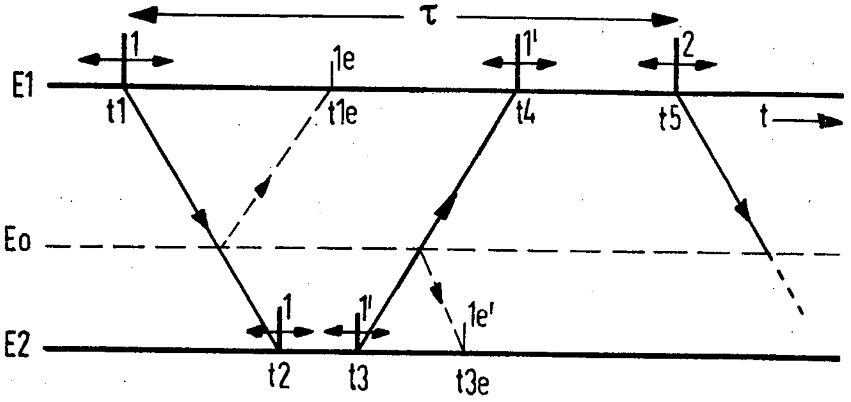
FIG. 2 is a time graph for the transmission, staggered with regard to time, of the phase modulated impulses in both transmission directions, according to the invention.

For better understanding of the chronological course of the transmission, reference is made to FIG. 2 representing a time diagram in which, on the uppermost line, the impulses arriving at the terminal E1 and leaving therefrom are entered above the time $t$. The same is true, if correctly coordinated with regard to time, for the terminal E2 which is entered on the lowermost line, with departure and arrival of impulses being indicated by respective perpendicular lines. The respective arrows crossing the latter designate the maximum time percentage modulation in a single direction. An impulse 1 leaving the terminal E1 at the time $t1$ arrives at the terminal E2 at the time $t2$, and as a result of the impulse 1, the terminal E2, at the time $t^3$, transmits the impulse 1′ to the terminal E1, arriving there at the time $t4$. The time interval represented by the time difference $t4-t1$ may be, at the most, equivalent to the mean or center period $\pi$ of successive impulses from the terminal E1. The next impulse following the impulse 1 at the time $t5$ designated in FIG. 2 by the numeral 2.

Assuming that the terminal E1 represents an additional PPM connection of the exchange installation and the terminal E2 represents a PPM subscriber connection of a telephone installation, the mean period $\pi$ of the impulse sequence proceeding from the terminal E1 must, with due regard for the scanning theorem, correspond to the reciprocal value of the twofold signal band width. If one proceeds from a signal band width of 4 kHz., there is obtained for the mean period $\pi=125$ $\mu$sec. The transit time of a paper insulated cable such as generally customary for subscriber lines, amounts to approximately 4.7 $\mu$sec./km. for bipolar impulses with a peak of the spectral energy above 50 kHz. On the basis of the occurrence of a maximum length of approximately 7 km. with respect to such subscriber connection lines, there is obtained a total transit time for the forward and return directions 66 $\mu$sec. Furthermore, if an impulse duration of 10 $\mu$sec. is assumed, which with regard to bipolar impulses corresponds to a peak frequency of 100 kHz., there is obtained, when fully exploiting the mean period of 125 $\mu$sec., for the maximum time percentage modulation in one direction of 9.8 $\mu$sec. This relatively large percentage modulation is sufficient to assure adequate maintenance of appropriate requirements for quality of transmission. This is possible for the maximum length of 7 km. of a subscriber connection line in advantageous manner by the feature that an impulse emitted by the terminal E1 and received at the terminal E2 is immediately there re-utilized as transmitting impulses with modulation for transmission in return direction.

Between the time vectors for the terminals E1 and E2, a time designation E*o* is additionally indicated by the broken line in FIG. 2. This line is intended to represent a junction point of the line at which a portion of the energy of the impulses transmitted in one direction is reflected back toward the transmitting side. The broken line E*o* also may be considered as a further terminal which is located at the junction point of the cable, i.e., at an intermediate distance from the terminal E1 and from the terminal E2 which thus is less than the distance between the two terminals. The impulses arriving from this imaginary terminal E*o* at the time *t1e* with respect to terminal E1, or at the time *t3e* with respect to the terminal. E2 should in any case be essentially larger than the echo impulses 1*e* or 1*e'* arriving there at this time because such echo impulses have to cover twice as great a distance as the impulses of the imaginary terminal E*o* at the location of the junction point of the cable. Even when assuming a total reflection, the echo impulses would have to be smaller by the active attenuation return of the cable length between the junction point and the terminal E1 or E2. This knowledge is utilized in the controllable threshold control circuit for the suppression of echo impulses by the feature that with each impulse leaving a terminal, the threshold voltage of the circuit of this terminal is adjusted to its maximum value and then such threshold voltage steadily decreases until the next departing impulse in such a manner that echo impulses are definitely suppressed while the impulses to be received from the distant terminal can readily overcome such threshold.

Figure 3:
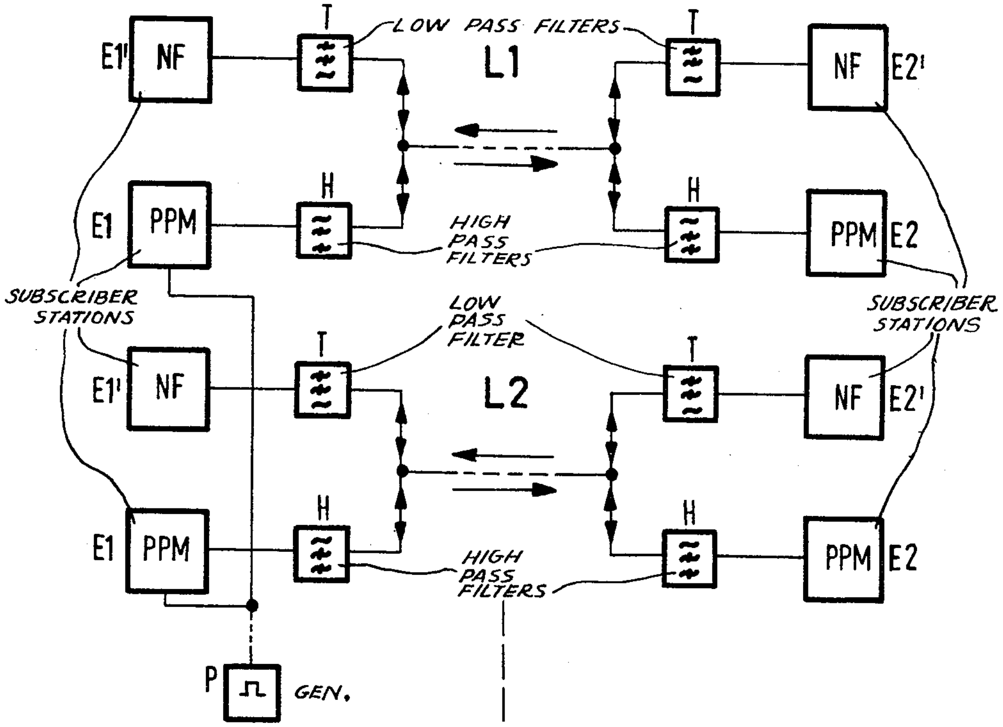
FIG. 3 is a block diagram of telephone subscriber connections embodying the invention.

The block circuit diagram represented in FIG. 3 illustrates a preferred application of the invention for the creation of an additional subscriber's station per subscriber line in a telephone network. Each one of the subscriber lines L1, L2, etc. is utilized in dual manner by the feature that a PPM subscriber's station E1 and E2 is assigned to the NF subscriber's station E1' and E2' at the exchange side and at the subscriber's side respectively. The decoupling between the NF subscriber's station and the PPM subscriber's station is achieved, both at the side of the exchange apparatus and at the side of the subscriber, by a low pass/high pass filter combination in which the low pass filter T is connected in series ahead of the NF subscriber's station and the high pass filter H is connected in series ahead of the PPM subscriber's station. The impulse generator supplying the impulses to be modulated for the modulator of the exchange side PPM subscriber's station is connected in common with all of the PPM subscriber's stations at the exchange side. As has already been mentioned, because of this, adjacent cross talk between different subscribers is likewise eliminated as the utilization of a common impulse supply permits a simultaneous transmission of impulses over the subscriber lines assigned to the additional subscriber stations always in only one direction.

A circuit diagram illustrating in greater detail an exchange side and a subscriber side PPM subscriber's station according to FIGS. 1 and 3 is presented in FIG. 4, in which the subscriber stations representing terminals of the subscriber lines are, in accordance with FIG. 3, again designated E1 and E2. Each of the two terminals E1 and E2 is connected to the subscriber's line only shown by broken lines via a high pass consisting of a condenser C*h* and a transformer U*h*. Each terminal further includes at the transmitting side a modulator M, the phase modulated output impulses of which release a blocking oscillator S*p*. The single polarity impulses of the blocking oscillator S*p* are conducted to the amplifier V, the output of which is connected to a winding of the transformer U*h*. The single polarity impulses are transformed in the high pass consisting of the transformer U*h* and the condenser C*h*, for transmission over the line, into a bipolar shape, favorable for this process, with a peak frequency above 50 kHz.

At the receiving end, both terminals include the controllable threshold control circuit S, the input of which is connected with the subscriber's line over a winding of the transformer U*h* and the output of which is connected to the demodulation circuit consisting of the modulation convertor K and the adjacent low pass filter TP. At the terminal E1, the low frequency output *a* of the low pass filter TP as well as the modulation voltage input *e* of the modulator M are conducted together to the actual exchange side subscriber's station TA over the hybrid circuit GA. At the terminal E2 the telephone receiver H of the subscriber station is connected to the output *a* of the low pass filter TP and the microphone M*i* of the telephone handset of the subscriber's station is connected to the input *e* of the modulator.

The threshold control circuit comprises, on the one hand, the parallel connection of the condenser C3 and resistance R3, connected with the base of the transistor T*r* over a winding of the transformer U*h* and the condenser C2. The base of the transistor T*r* is connected to the positive side of the direct operating voltage source over the very high resistance R2. In a similar manner the collector of the transistor is connected with the direct operating voltage over the resistance R1. The output of the threshold control circuit is formed by the collector circuit of the transistor T*r* which is connected at the terminal E1 directly, and at the terminal E2 over an oscillatory circuit (to be subsequently explained in detail) to the input of the respective modulation convertor K which, in this connection, represents a bistable circuit. The transistor circuit is designed for impulse peak operation. For this purpose the transistor T*r* is blocked. The high resistance R2 and the condenser C2 together with the transistor T*r* form an automatic control circuit with respect to the amplitude of the arriving impulses whereby the transistor T*r* switches over from the blocking state into the conducting state only with respect to the positive peaks of such impulses.

The common point of connection of the winding of the transformer U*h* with the resistance R3 and the condenser C3 is connected to the output of the blocking oscillator S*p* over the diode D2, the condenser C3 being charged over such diode by the negative impulses of the blocking oscillator S*p* and therewith the threshold of the transistor T*r* is adjusted for a maximum value whereby the transmitting impulse cannot become effective over the transistor T*r* at the input of the demodulation circuit. Subsequently, the condenser C3 discharges over the resistance R3 in the manner previously described.

Figure 4A:
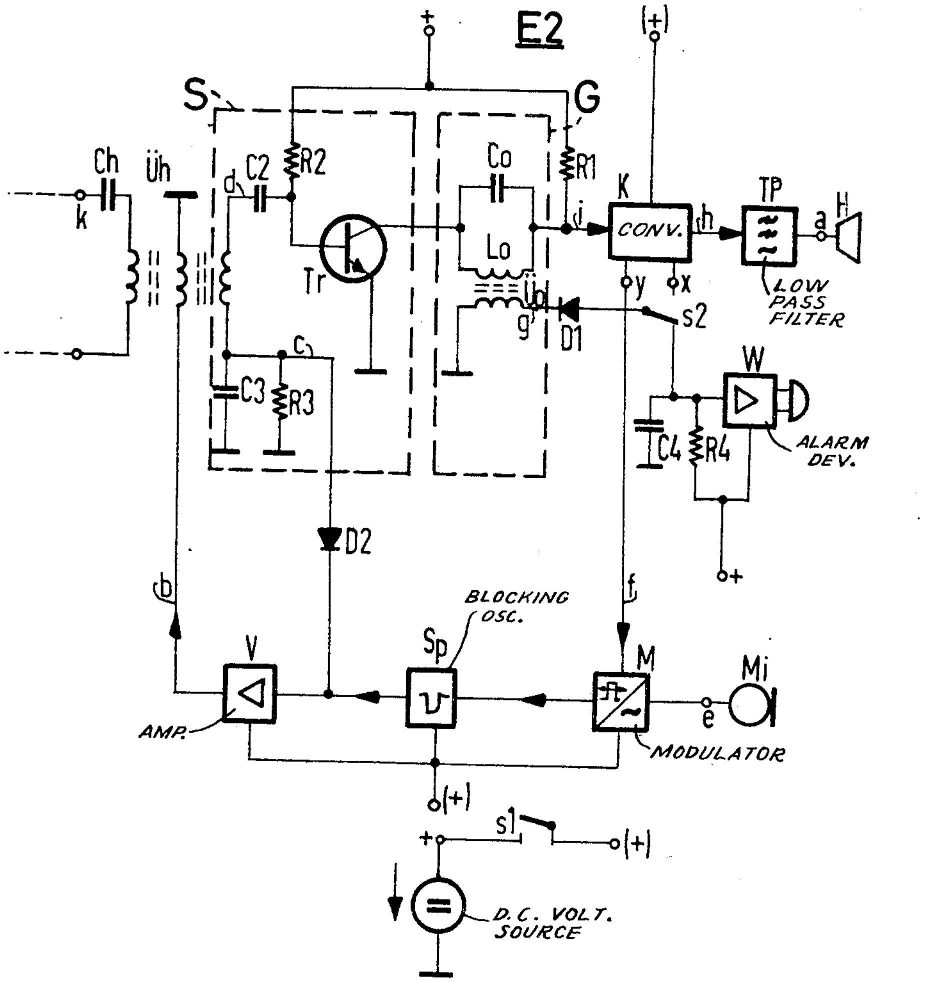

At the terminal E2 an oscillation circuit, consisting of the condenser C*o* and the coil L*o* which, together with a second winding for the transformer U*o*, is located between the input of the modulation converter K and the collector of the transistor T*r*. The oscillation circuit performs the function of the generator G according to FIG. 1. The second winding of the transformer U*o* may be optionally connected with the additional input of the modulation convertor K and the input of a signal or alarm device W over the rectifier D1 and the change-over switch *s*2. In corresponding manner the further input *x* of the modulation convertor K of the terminal E1 is connected to the output of the blocking oscillator over the rectifier D1. The input of the alarm device W at the terminal E2 is, on the one hand, connected with reference potential over the condenser C4, and on the other hand with the positive side of the operating direct voltage source over the resistance R4. The line for supplying the operating direct voltage to the modulation convertor K, the amplifier V, the blocking oscillator S*p* and the modulator M of the terminal E2 is connected with the positive pole of the operational direct voltage source only when the switch *s*1, appearing at the bottom of the right side of FIG. 4*a*, is closed. The switch *s*1 and the change-over switch *s*2 are assigned to the subscriber set and are mechanically operated by the receiver hook or its equivalent In the illustrated position of the switches the transmitting end of the terminal E2 is in an inoperative condition, so that it cannot transmit any impulses to the terminal E1.

At the terminal E1 the circuit breaker contacts *sr*1 of the signalling relay *rls* are disposed in the transmission path of the modulator M towards the input of the blocking oscillator S*p*. This relay is rhythmically energized via its control input *r*, in known manner, if the subscriber is called, whereby the impulses continuously transmitted from the terminal E1 to the terminal E2 are interrupted in rhythm with the opening and closing of the contacts *sr*1. At the terminal E1 the modulation convertor K is provided with an additional output which serves for the controlling of a relay *rls*2 which effects the loop short. This relay responds as soon as impulses are sent from the terminal E2 to the terminal E1 and by means of its operating contact *sr*2 closes the subscriber's loop S*ch*1. Simultaneously, the relay *rls*2 performs a selection function by the feature that it interrupts the loop short in the same manner as in a normal subscriber station, in accordance with the selection signals, i.e., in accordance with the impulse groups.

For a better understanding of the operation of the terminals E1 and E2 according to FIG. 4, FIGS. 5 and 6 illustrate the time curves of the most important voltages with respect to one another. The individual diagrams marked with lower case letters refer, in each case, to the points in the circuit of FIG. 4 at which the indicated voltage occurs. First of all, it will be recalled that the terminal E2 representing the subscriber station, when the receiver of the telephone handset is hung up (switch *s*1 and change-over switch *s*2 in the illustrated positions) can continuously receive impulses from the terminal E1 but, however, does not emit any. When a subscriber is called via the terminal E1, the signalling relay *rls*1 interrupts the impulses transmitted from the terminal E1 to the terminal E2 rhythmically over its contact *sr*1. The oscillation derived from these impulses over the oscillatory circuit *Co/Lo* is likewise interrupted by the rhythmical interruption of the arriving impulses so that the continuous discharge of the condenser C4 of the alarm device charging via the resistance R4 over the rectifier D1 is disturbed in the sequence of the interruptions. As a result, the alarm means of the alarm device W is actuated. When the receiver is removed, the switch *s*1 and the changeover switch *s*2 are operated. Because of this the transmitting circuit of the terminal E2 receives operating current and the oscillation derived from the oscillatory circuit *Co/Lo* from the arriving impulses is applied to the additional output *x* of the modulation convertor K.

The oscillatory circuit *Co/Lo* has a relatively high Q factor so that the oscillation *g* derived by it from the arriving impulses *i* shows practically no communiaction content. As has already been explained by means of FIG. 1, its negative half period is utilized in order to determine the unmodulated flank of the received phase modulated impulses to be transformed into continuously modulated impulses. The phase modulated impulses on the receiving side conducted to the modulator M at the terminal E2, from the output *y* of the modulation convertor, for modulation (diagram *f*), as a result of the application of the operating voltage to the modulator M, the blocking oscillator *Sp* and the amplifier V are now modulated, reproduced in the blocking oscillator, amplified and applied to the subscriber's line via the high pass transforming them into bipolar impulses.

The phase modulated impulses arriving at the input of the demodulation device have, as the diagram *i* of FIG. 5 indicates, a single polarity shape since the transistor T*r* of the threshold value circuit only utilizes the most positive peaks of the arriving impulses and permits only these peaks to reach the input of the modulation convertor, due to the circuitry with opposite polarity. These single polarity impulses excite the oscillatory circuit *Co/Lo* in the collector circuit of the transistor T*r* and produce the sine oscillation (*g*), freed of communication content, at the secondary winding of the transformer U*o*.

With respect to the continuously modulated impulses (*h*) occurring at the output of the modulation convertor K of both terminal points, the leading flank or edge, as distinguished from the trailing flank, is respectively modulated by the required message. As already mentioned, the trailing flank is determined at the terminal point E2 by the negative half-wave of the sine oscillation (*g*) adjacent the additional input *x*.

At the terminal E1 this is effected by the negative impulses at the output of the blocking oscillator S*p* which are applied to the additional input *x* of the modulation convertor K of this terminal via the diode D1. These impulses are modulated in their phase by the low frequency modulation signal (NF) at the input *e* of the modulator M of this terminal. However, since the impulses transmitted from the terminal E1 are, in addition to the modulation imparted to them at the terminal E2, also still subject to the modulation originally impressed thereon at the terminal E1, this first modulation is cancelled during the transformation of the arriving phase modulated impulses into continuously modulated impulses. The single polarity transmission impulses *b* at the amplifier are, as already mentioned, transformed in the high pass into bipolar impulses and conducted in this form to the subscriber's line. In diagram K of the voltage at the inputs and outputs of the high passes, the bipolar impulses at the transmitting side are designated 1, 2, 3 and the impulses at the receiving end are designated 1', 2'.

Diagram *c* of FIG. 6 illustrates the voltage course at the condenser C3 of the threshold control circuit, the negative amount of which determines the threshold which must be overcome by the bipolar impulses, arriving from the subscriber's line via the high pass, if they are to be utilized in the demodulation circuit. Since the charging time constant of the condenser C3 over the diode D2 is so small that it may be disregarded, the condenser C3 charges quickly with each negative impulse at the output of the blocking oscillator S*p* to their peak value and subsequently discharges toward the zero value in an exponential manner according to the time constant as determined by the resistance R3 and the condenser C3. Because of the switching properties of the transistor T*r*, a blocking potential occurs at the condenser C2 connecting its base with the transformer U*o*, said potential U*o* in diagram *d*, the size of which is defined by the most positive amplitude of the bipolar impulses received from the distant terminal. With respect to the voltage at the condenser C3, the impulses arriving from the subscriber's line are additive because of the series connection of the transformer winding of the transformer U*h*. As evident from diagram *d*, the threshold control circuit, due to the voltage gradient at the condenser C3, eliminates a reactive effect of the transmitting impulses at the receiving portion of the same terminal, as well as of echo impulses which may occur. Besides the impulse 1 arriving from the distant terminal, two echo impulses 1*e* and 2*e*, preceding it in time, are superimposed on the threshold voltage. In this case the echo impulse 1*e* has a larger amplitude than the arriving impulse 1 from the distant terminal. As evident from the time position of such echo impulses, the latter can occur only when the junction point of the subscriber's line lies sufficiently close to the terminal which receives it. As the distance of the junction point is increased, the echo impulses (2*e*) are correspondingly decreased because of the increasing path attenuation ratio. Consequently, an echo impulse occurring in the time interval adjacent to an impulse received from the distant terminal is much smaller, so that the small threshold voltage in this time interval is, as desired, only overcome by such impulse, and not by the echo impluse.

The operational direct voltage source for the PPM subscriber's station may, as has already been mentioned, be a cadmium storage cell which is connected over a sufficiently high resistance to the direct voltage conducted to the NF subscriber's station from the telephone exchange. This current supply is made possible by the feature that the PPM subscriber's station, corresponding to the example of construction illustrated in FIG. 4, requires little current when the telephone handset is hung up, and the talking times generally amount to only a few percent of the total time.

In the example of construction of an installation for the utilization of the method according to the invention, corresponding to the FIGS. 1, 3 and 4, the PM subscriber's stations are constructed as PPM subscriber's stations. However, one can also utilize the method according to the invention in similar manner when using pulse code modulation, for example delta modulation, for the incorporation of additional subscriber's stations.

Changes may be made within the scope and spirit of the appended claims which define what is believed to be new and desired to have protected by Letters Patent.

I claim:

1. A method for the additional transmission of communications by means of pulse modulation (PM), such as pulse-phase modulation (PPM), over lines of relatively short length, comprising the steps of transmitting modulated pulses from a first terminal to a second terminal, utilizing said pulses, following receipt thereof at the second terminal, to derive pulses for transmission in the opposite direction, modulating the pulses so produced, and so transmitting the pulses thus modulated, from the second terminal to the first terminal, that pulse transmitted from the second terminal arrives at the first terminal prior to the transmission therefrom of the next following pulse corresponding to that from which such pulse, arriving at the first station, was derived.

2. A method according to claim 1, wherein the transmission of the modulated pulses is effected in both directions over the same line.

3. A method according to claim 2 with pulse phase modulation, comprising utilizing a phase-modulated pulse emitted by the first terminal and received at the second terminal as a pulse to be modulated in phase for transmission in the opposite direction.

4. A method according to claim 3, wherein the total of the transit time of the phase-modulation pulses along the signal path in both transmission directions, for the twofold pulse-duration and the fourfold maximum time percentage modulation, is so selected that it is not greater than the mean period of the corresponding pulses succeeding one another in a single transmission direction.

5. A method according to claim 1, comprising subjecting the pulses arriving at the input of a terminal to an electrical threshold which must be overcome by the arriving impulse, adjusting said threshold to its maximum value by each corresponding pulse leaving at the transmitting side of such terminal, and subsequently decreasing said threshold voltage toward a minimum value, preferably in an exponential manner, which can be overcome only by the pulses emitted from the other terminal.

6. A method according to claim 4, comprising producing said pulses with bipolar shape, having a peak of the spectral energy above 50 kHz.

7. A method according to claim 1, wherein said pulses are utilized for the transmission of speech over a subscriber's line, operatively associated with a subscriber's line utilizing amplitude modulation (NF), comprising utilizing such a first terminal as the PM subscriber's station of the exchange apparatus and the second terminal as the PM subscriber's station, and decoupling the NF and PM subscriber's stations common to one subscriber's line at the terminal connections, by separation of the respective frequency bands involved in the respective transmissions.

8. A method according to claim 7, comprising supplying all of the PM subscriber's stations of the exchange apparatus (first terminals) with the pulses to be modulated and transmitted over the subscriber lines to the PM subscriber's station (second terminals) by the pulse sequence of a common pulse source.

9. A method according to claim 7, comprising continuously transmitting pulses at a predetermined frequency from the first terminal over the subscriber's line to the second terminal, and utilizing such pulses for the production of pulses to be modulated at the second terminal for transmission in opposite direction only if the subscriber's station representing the second terminal is placed in operation.

10. A method according to claim 9, comprising the further steps of rhythmically interrupting the impulses continuously transmitted from the first terminal to the second terminal as criterion for the subscriber call, and utilizing the reception of the pulses transmitted from the second terminal to the first terminal for the indication at the first terminal of the effective operation of the subscriber's station representing the second terminal, and transmitting the selection symbols from the second terminal to the first terminal in the form of a differently large number of rhythmical interruptions of the impulse sequence emitted by the second terminal.

11. An apparatus for the transmission of additional communications by means of pulse modulation (PM), such as pulse-phase modulation (PPM), over lines of relatively short length, comprising a first terminal connected by such a line with a second terminal, means at each station for demodulating pulses in accordance with desired information for transmission over such line to the other terminal, means at the first terminal for supplying transmission pulses to said modulation means thereat, demodulation means at each station for demodulating pulses received thereat to obtain the desired information modulated thereon, means at the second terminal for deriving from the pulses received thereat, pulses for transmission in the opposite direction, the modulation means at such terminal being operatively connected to said last mentioned means for modulating such pulses for transmission, a controllable threshold control circuit at each terminal operatively connecting the terminal input thereof with the input of the demodulating means thereat, each threshold control circuit having an input operatively connected to the output of the modulating means thereat whereby the output pulses therefrom form a control criteria for said threshold circuit.

12. An apparatus according to claim 11 for pulse-phase modulation, wherein the demodulation means comprises a modulation convertor and a low-pass filter at the output thereof, operative to transform received phase-modulated pulses, having a modulated flank and an unmodulated flank, into continuously modulated pulses, and to the input of which the phase-modulated pulses defining the modulated flank of the continuously modulated pulses are conducted, such modulation convertor having a further input operative for defining, with regard to time, the unmodulated flank of the continuously modulated pulses by means of a clock beat conducted to such input, said clock beat being derived at the first terminal from the output of the modulation means thereat, and at the second terminal from the pulses arriving at the receiving side of such terminal from the first terminal.

13. An apparatus according to claim 12, wherein each modulation convertor is a bistable flip circuit.

14. An apparatus according to claim 11, wherein the controllable threshold control circuit is a storage element determining the blocking potential of the control electrode of an amplifier element as a function of its charge, the charging time constant of which storage element is so small that it may be disregarded and the discharging time constant of which is proportioned in such a manner that the blocking potential effectively suppresses possible echo impulses with regard to the second terminal without impairing the reception of the impulses arriving from such terminal.

15. An apparatus according to claim 11, comprising means for imparting a bipolar shape to the transmitted pulses, a suitably poled rectifier operatively disposed, at the first terminal, between the output of the modulator and the control input of the threshold control circuit thereat, and a further suitably poled rectifier operatively disposed, at the second terminal, between the modulation convertor and the control input of the threshold control circuit thereat.

16. An apparatus according to claim 11, wherein to each PM subscriber's station a storage cell, is provided for the current supply, said cell being connected to the direct voltage conducted to an associated subscriber's station utilizing amplitude modulation (NF), over a charging resistance from the exchange, such charging resistance being proportioned with a sufficiently high resistance that the shunt created thereby will not simulate a loop in the telephone exchange.

References Cited

UNITED STATES PATENTS

| | | | |
|---|---|---|---|
| 2,509,237 | 5/1950 | Labin et al. | 343—178 |
| 2,554,893 | 5/1951 | Brunn | 325—38 X |
| 2,566,218 | 8/1951 | Calvez | 178—58 |

FOREIGN PATENTS

| | | |
|---|---|---|
| 950,746 | 10/1949 | France. |
| 773,030 | 4/1957 | Great Britain. |

RALPH D. BLAKESLEE, Primary Examiner

U.S. Cl. X.R.

325—38; 343—178